(12) United States Patent
Lottes et al.

(10) Patent No.: US 9,349,498 B2
(45) Date of Patent: May 24, 2016

(54) DIELECTRIC MATERIAL WITH NON-LINEAR DIELECTRIC CONSTANT

(71) Applicant: 3M INNOVATIVE PROPERTIES COMPANY, St. Paul, MN (US)

(72) Inventors: Andrew C. Lottes, Austin, TX (US); Nanayakkara L. D. Somasiri, Austin, TX (US); Jimmie R. Baran, Jr., Prescott, WI (US); Badri Veeraraghavan, Woodbury, MN (US); Paul V. Huynh, Pflugerville, TX (US); Dipankar Ghosh, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/581,325

(22) Filed: Dec. 23, 2014

(65) Prior Publication Data

US 2015/0137047 A1    May 21, 2015

Related U.S. Application Data

(62) Division of application No. 12/962,022, filed on Dec. 7, 2010, now Pat. No. 8,974,706.

(60) Provisional application No. 61/286,247, filed on Dec. 14, 2009.

(51) Int. Cl.
*H01B 1/04* (2006.01)
*H01B 1/24* (2006.01)
*H01B 3/00* (2006.01)
(Continued)

(52) U.S. Cl.
CPC .. *H01B 1/24* (2013.01); *H01B 1/22* (2013.01); *H01B 3/004* (2013.01); *H01B 3/28* (2013.01); *H02G 15/064* (2013.01); *H02G 15/103* (2013.01); *H02G 15/184* (2013.01)

(58) Field of Classification Search
CPC .............. H01B 1/22; H01B 1/24; H01B 1/20; H01B 1/08; H01B 1/128; H01B 3/004
USPC ........ 252/502, 506, 509, 511, 519.31, 519.33
See application file for complete search history.

(56) References Cited

U.S. PATENT DOCUMENTS

| | | |
|---|---|---|
| 3,666,876 A | 5/1972 | Forster |
| 4,234,439 A | 11/1980 | Kehr |

(Continued)

FOREIGN PATENT DOCUMENTS

| | | |
|---|---|---|
| CA | 2051481 | 9/1991 |
| CN | 101225245 | 7/2008 |

(Continued)

OTHER PUBLICATIONS

CN 101225245 machine translation.*

(Continued)

*Primary Examiner* — Khanh Tuan Nguyen
(74) *Attorney, Agent, or Firm* — Gregg H. Rosenblatt

(57) ABSTRACT

Provided is a composition comprising a polymeric material, a filler material dispersed in the polymeric material, the filler material comprising inorganic particles and a discontinuous arrangement of conductive material wherein at least a portion of the conductive material is in durable electrical contact with the inorganic particles, and conductive material dispersed in the polymeric material.

10 Claims, 7 Drawing Sheets

(51) Int. Cl.
*H01B 3/28* (2006.01)
*H01B 1/22* (2006.01)
*H02G 15/064* (2006.01)
*H02G 15/103* (2006.01)
*H02G 15/184* (2006.01)

(56) References Cited

U.S. PATENT DOCUMENTS

| | | | |
|---|---|---|---|
| 4,363,842 A | 12/1982 | Nelson | |
| 4,470,898 A | 9/1984 | Penneck | |
| 4,726,991 A | 2/1988 | Hyatt | |
| 6,251,513 B1 * | 6/2001 | Rector | H01C 7/105 428/323 |
| 6,268,054 B1 * | 7/2001 | Costantino et al. | 428/403 |
| 7,169,327 B2 * | 1/2007 | Ito et al. | 252/500 |
| 7,588,826 B2 | 9/2009 | Zaghib | |
| 2005/0218380 A1 | 10/2005 | Gramespacher | |
| 2006/0145119 A1 | 7/2006 | Onneby | |
| 2006/0186384 A1 | 8/2006 | Gerhardt | |
| 2007/0117898 A1 | 5/2007 | Tan | |
| 2008/0006796 A1 | 1/2008 | Khatua | |
| 2009/0242855 A1 | 10/2009 | Fleming | |
| 2009/0309195 A1 * | 12/2009 | Giraud et al. | 257/632 |

FOREIGN PATENT DOCUMENTS

| | | | |
|---|---|---|---|
| CN | 101225245 A * | 7/2008 | |
| CN | 101440180 | 5/2009 | |
| EP | 0035271 | 9/1981 | |
| EP | 1387367 | 2/2008 | |
| JP | 55057426 | 4/1980 | |
| JP | 55-099984 | 7/1980 | |
| JP | 59-149714 | 8/1984 | |
| JP | 2003-026932 | 1/2003 | |
| RU | 2282263 | 8/2006 | |
| WO | WO 2008008689 | 1/2008 | |

OTHER PUBLICATIONS

The Sol-Gel Preparation of Silica Gels, Buckley et al, Journal of Chemical Education, vol. 71, No. 7, Jul. 1994.*

Chinese Office Action and Search Report dated Nov. 25, 2014 for Chinese Patent Application No. 201080056831.0.

Japan Office Action, Patent Application No. 2012-544606, 2pgs.

Kalyon et al., "Electrical Properties of Composites as Affected by the Degree of Mixedness of the Conductive Filler in the Polymer Matrix", Polymer Engineering and Science, Jul. 2002, vol. 42, No. 7, pp. 1609-1617.

Kühner et al., "Silikatnanopartikel als verstärkende Füllstoffe in Siliconen / Nano silicate particles as reinforcing fillers in silicones", GAK Gummi Fasern Kunststoffe, vol. 61, Issue 9, Sep. 2008, pp. 557-560.

Moon et al., "Dielectric properties of epoxy-dielectrics-carbon black composite for phantom materials at radio frequencies", Journal of Applied Polymer Sciences, 77(2000) 1294-1302.

Moulart et al., "Polymeric composites for use in electronic and microwave devices", Polymer Engineering and Science, 44(3)(2004), 588-597.

Obrzut et al., "High frequency loss mechanism in polymers filled with dielectric modifiers", Materials Research Society, 783(2004), 179-184.

Russian Office Action dated Aug. 29, 2014, 8pgs.

Safari et al., "Dielectric properties of epoxy-barium titanate-carbon black composites", Plastics, rubber and composites processing and applications, 199524(3):157-164.

Tuncer et al., "Electrical properties of epoxy resin based nano-composites", Nanotechnology, 18 (2007).

Wang et al., "Interface modification and characterization in linear low-density polyethylene highly loaded with aluminum hydroxide", Polymer Composites, Oct. 2002, vol. 23, No. 5.

Xu et al., "Synthesis of addition liquid vinylsiloxane rubber I. Effect of vinyl silicone oil on Abstract mechanical property of silicone rubber", He cheng xiang jiao gong ye (China Synthetic Rubber Industry), 2002 25(5):286-288.

Yang et al., "Influence of surface modifier and silicone oil on the mechanical properties of HDPE/Al(OH)3 composite", Gongcheng Suliao Yingyong, 29(3) 32035(2001).

Zhang et al., "Effect of silicone oil on the mechanical properties of highly filled HDPE composites", Polymers & Polymers Composites, 2000 8(7):471-476.

Zhu et al., "Effects of Silicone Oil and Polymeric Modifiers on the Mechanical Properties of Highly Filled LLDPE", Journal of Applied Polymer Science, vol. 83, 121-128 (2002).

Notice of Allowance for Japanese Patent Application No. 2012-544606, 3pgs, dated Jun. 30, 2015.

* cited by examiner

DIELECTRIC MATERIAL WITH NON-LINEAR DIELECTRIC CONSTANT

CROSS REFERENCE TO RELATED APPLICATION

This application is a divisional of U.S. patent application Ser. No. 12/962,022, now allowed, which claims the benefit of U.S. Provisional Patent Application No. 61/286,247, filed Dec. 14, 2009, the disclosure of which is incorporated by reference herein in its entirety.

TECHNICAL FIELD

This invention relates to a dielectric material having a non-linear dielectric constant and other properties useful for electrical stress relief.

BACKGROUND

High dielectric constant (Hi-K) elastomeric composites are commonly used in cable accessories to control electrical field stresses built up at the locations of splices and terminations. Typically, these materials are carbon black filled elastomers such as EPDM and silicone that give a certain range of dielectric (K) values for stress relief. These elastomeric composites also contain barium titanate (BT) or inorganic fillers that have very high dielectric constants (Hi-K). In order to achieve high dielectric constant of these composites, high filler loadings (>50 volume percent) are typically required. These high loadings drastically reduce the processability and mechanical properties of the resulting composites. For many polymer matrixes, loadings at these levels are not very practical. For carbon filled composites, the volume loading of carbon powder should be near the percolation threshold which is very hard to control. For some silicone based systems, Hi-K polymeric additives such as epichlorohydrin have been used to increase the dielectric constant of the resulting composite. These types of composites generally have high dielectric losses (dissipation factor). As a result, such a composite can lead to an increase in temperature in the dielectric material, which can exceed the thermal load capability of the connector and cable.

SUMMARY

One embodiment of the present invention features a novel composition comprising: a polymeric material, a filler material dispersed in the polymeric material, the filler material comprising inorganic particles and a discontinuous arrangement of conductive material wherein at least a portion of the conductive material is in durable electrical contact with the inorganic particles, and conductive material dispersed in the polymeric material.

Another embodiment of the present invention features a novel article comprising: an electrical stress control device comprising a filler material dispersed in a polymeric material, the filler material comprising inorganic particles and a discontinuous arrangement of conductive material wherein at least a portion of the conductive material is in durable electrical contact with the inorganic particles, and conductive material dispersed in the polymeric material.

Another embodiment of the present invention features a novel method of making an electrical stress control device comprising:
    forming a filler material comprising inorganic particles and a discontinuous arrangement of conductive material wherein at least a portion of the conductive material is in durable electrical contact with the inorganic particles,
    blending the filler material into a polymeric material to form a polymeric composition, and
    forming the polymeric composition into a stress control device.

As used in this invention:

"electrical contact" between a conductive material and an inorganic particle means that a portion of the conductive material is touching, or is in sufficient physical proximity to, the inorganic particle so that a charge can travel between the conductive material and the inorganic particle thereby allowing current to flow directly or by forming an Ohmic contact hopping or tunneling effect under an applied voltage field of less than the breakdown voltage of the polymeric material;

"durable electrical contact" means that the electrical contact is not substantially altered by mixing and shearing forces encountered during composition processing steps; and "percolation threshold" means the critical fraction of lattice points that must be filled to first create an infinitely continuous conductive path.

The above summary of the present invention is not intended to describe each disclosed embodiment or every implementation of the present invention. The Figures and detailed description that follow below more particularly exemplify illustrative embodiments.

DETAILED DESCRIPTION

In the following detailed description of the preferred embodiments, reference is made to the accompanying drawings that form a part hereof. The accompanying drawings show, by way of illustration, specific embodiments in which the invention may be practiced. It is to be understood that other embodiments may be used, and structural or logical changes may be made without departing from the scope of the present invention. The following detailed description, therefore, is not to be taken in a limiting sense, and the scope of the invention is defined by the appended claims.

Figure 1:
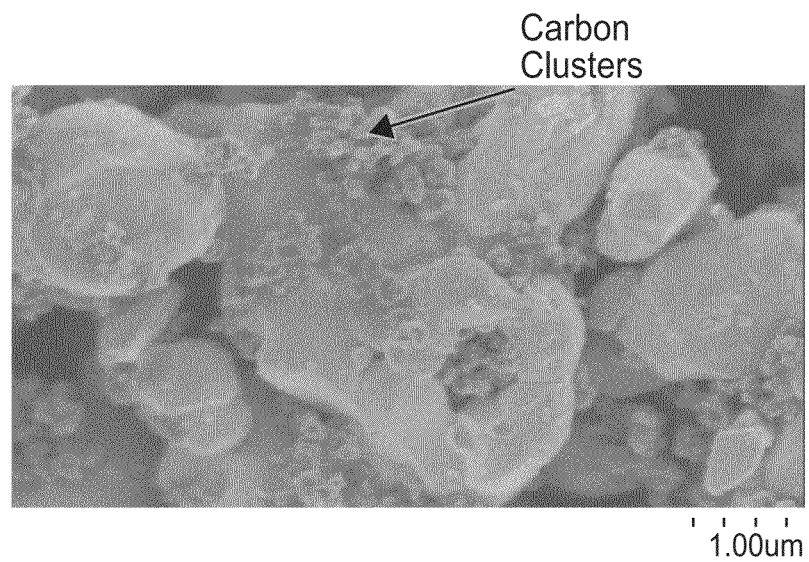
FIG. 1 is a scanning electron microscope (SEM) digital image of barium titanate particles on which carbon powder is affixed according to an embodiment of the present invention.

Embodiments of the present invention include novel filler materials such as the one shown in FIG. 1. The filler material includes inorganic particles on which conductive material, such as conductive particles, is affixed in durable electrical contact. As will be explained in more detail later, the conductive material is applied to the inorganic particles in a manner that provides a sufficient electrical, e.g., static, or chemical, attraction between the inorganic particles and conductive material to inhibit the conductive material from separating from the inorganic particles during handling and subsequent material processing steps. The inorganic particles with which the conductive material is affixed in durable electrical contact may then be added to a polymeric material to form a dielectric composition. These compositions have significantly better electrical properties than traditional carbon filled polymers.

Figure 2:
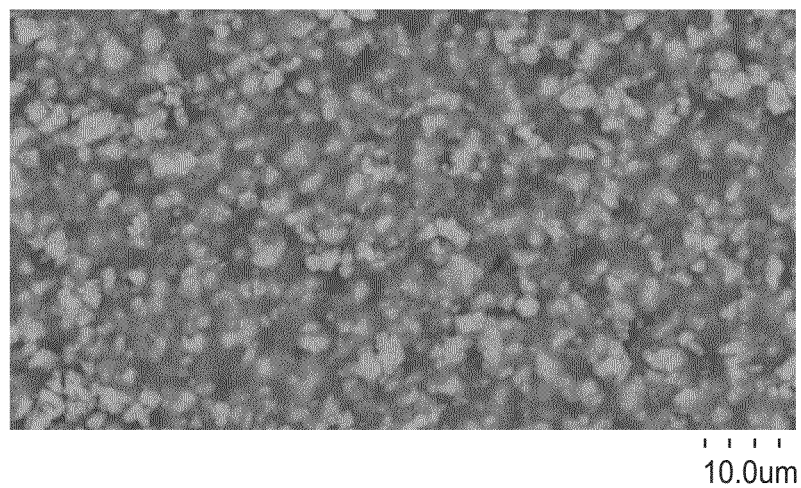
FIG. 2 is an SEM digital image of a cross-section of a polymeric composition containing the particles shown in FIG. 1.

In some embodiments, the compositions were first prepared by affixing in durable electrical contact the surface of barium titanate (an inorganic ferroelectric ceramic) particles with a highly structured form of conductive carbon powder that has high void volume and high conductivity, such as that available under the trade designation ENSACO 250 G, from TimCal Graphite & Carbon Corp., Bodio, Switzerland, and having a nominal particle diameter of 40 nm, and then dispersed in a silicone polymer (a polymer having an SiO backbone) matrix as shown in FIG. 2. The resulting elastomeric compositions after curing had a high dielectric constant (>20), low loss (<0.04) and high dielectric breakdown strength (>140 V/mil) and unexpectedly exhibited field dependent permittivity (non-linearity). These non-conducting (low loss) compositions exhibited the unique non-linear property of a gradually increasing dielectric constant with an increasing electric field. In some preferred embodiments, the barium titanate volume loading in the composition is greater than 20 volume percent and the barium titanate to carbon percent volume ratio is between about 6 and about 12. However, the elongation to break for these compositions is less than about 150%, so they are most suitable for applications that do not require superior mechanical properties.

In other embodiment of the invention, good mechanical properties as well as the unique non-linear electrical property are obtained. In these embodiments, the composition includes an elastomeric composite comprised of (a) a high dielectric constant filler such as nanosilica (i.e., nanometer sized silica particles)-modified barium titanate (25 v %), (b) carbon powder (3.0 v %) and (c) silicone oil (an oil comprising oligomers having an SiO backbone) (10 v %) in a silicone rubber matrix. The unique combination of nanosilica-modified barium titanate together with the silicone oil additive substantially enhanced the filler (barium titanate) dispersion and reinforcement with silicone matrix. As a result, this composition showed improved mechanical (elongation to break>300%, tensile strength 372-520 psi) and electrical (dielectric constant 23-30, dissipation factor<0.05 and breakdown strength 180-210 V/mil) properties, and had a preferred conductivity profile that provided an improved impulse performance. These improved properties make at least some embodiments of the composition and articles of the invention especially useful for stress control in high voltage cable accessories that require superior mechanical properties, such as cold-shrink applications.

Figure 3:
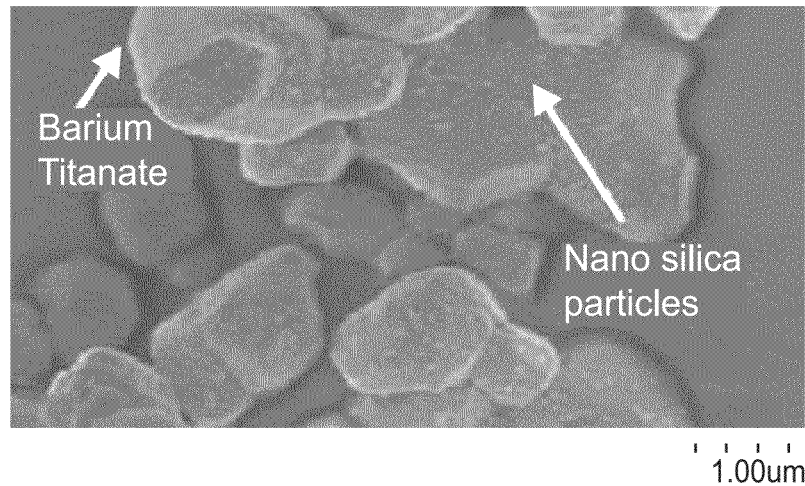
FIG. 3 is an SEM digital image of barium titanate particles modified with nanosilica particles according to an embodiment of the present invention.
Figure 4:
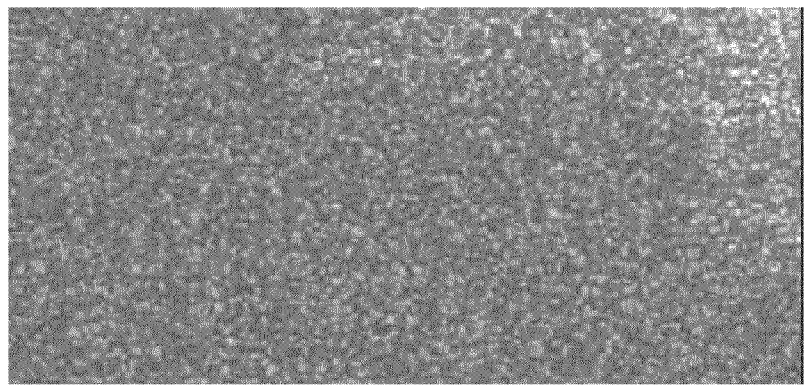
FIG. 4 is an SEM digital image of a cross-section of a polymeric composition containing the particles shown in FIG. 3.

Some of the improved properties were achieved by improving filler dispersion and reinforcement with silicone rubber by using a unique combination of nanosilica-modified filler (barium titanate) and silicone oil additive. An example of the nanosilica-modified filler is shown in FIG. 3. The composite showed homogenous particle distribution throughout the silicone matrix, as shown in FIG. 4, and also had substantially improved electrical properties as well.

Suitable materials for the inorganic particles of the present invention include, for example, BaTiO3 particles, BaSrTiO3 particles, CaCu3Ti4O12 particles (including, e.g., particles calcined or sintered at a temperature of 800° C.), and SrTiO3 particles, or mixtures thereof. Such particles may be pure or may be modified, such as by doping, or by adding other ingredients. Preferably the inorganic particles have a relative dielectric constant of greater than 80. The inorganic particles may have any suitable shape such as spheres, plates, platelets, cubes, needles, oblate, spheroids, pyramids, prisms, flakes, rods, fibers, chips, whiskers, etc. or mixtures thereof. A suitable size, e.g., diameter, for the inorganic particles is lower limit of about 0.7 µm to about 1.0 µm, and an upper limit of about 0.8 µm to about 2.1 µm.

The inventors found that the mechanical properties of at least some embodiments of the compositions of the invention could be enhanced by modifying the inorganic particles with nano-silica. For example, it was found that the combination of nanosilica-modified barium titanate with silicone oil substantially enhanced the barium titanate dispersion and reinforcement in the matrix of silicone polymer material. The barium titanate was modified with nanosilica by mixing the barium titanate with hydrophobically-modified nanoparticles in toluene and evaporating the toluene. The dried material was shaken with ceramic marbles to reduce particle agglomeration. The nanosilica-modified barium titanate was then ground together with carbon powder. A suitable weight % of nano-silica particles to inorganic particles is about 0.5 to about 1.0, preferably about 0.75. Suitable sizes of the nanosilica particles are about 1 to about 50 nm, preferably about 5 nm. Typically, the inorganic particles on which the nanosilica particles are applied have a diameter of about 0.8 µm to about 2.1 µm.

Suitable materials for the conductive material include, for example, carbon blacks, carbon nanotubes, insulating particles having conductive coatings, metals and metallic powders, for example aluminum, gold, silver, chromium, copper, palladium, nickel and alloys thereof. The conductive material may be in any suitable form such as clusters, e.g., clusters of carbon particles, individual particles, and vaporized solids that may be coated or deposited on the inorganic particles. If the conductive material is particulate, it may have any suitable shape such as spheres, plates, platelets, cubes, needles, oblate, spheroids, pyramids, prisms, flakes, rods, fibers, chips, whiskers, etc. or mixtures thereof.

The application, or affixation, of the conductive material to the inorganic particles can be performed in any suitable manner, such as, for example, grinding, ball milling, impact-coating, and magnetically-assisted impact coating the conductive material and inorganic particles together, coating, solvent-coating, vapor-depositing, and liquid dispersing the conductive material on the inorganic particles, or using any other known suitable method such that the conductive material forms a discontinuous arrangement wherein at least a portion of the conductive material is in durable electrical contact with the inorganic particles. The conductive materials may be applied to a small or large area of the surface of the inorganic particles. Determination of the appropriate amount of conductive materials applied to the inorganic particles depends on various factors such as the combination of materials in the composition, e.g., conductive material, inorganic particle, polymer, additives, and the intended use of the material.

The basic polymeric material may be selected from a large range of polymers. Blends of two or more polymers may be desirable in some cases and the polymers selected will depend at least to a certain extent on the purpose to which the material is to be put. Examples of polymers suitable either alone or in blends include elastomeric materials, for example silicone or EPDM; thermoplastic polymers, for example polyethylene or polypropylene; adhesives, for example those based on ethylene-vinyl-acetate; thermoplastic elastomers; gels; thermosetting materials, for example epoxy resins; or a combination of such materials, including co-polymers, for example a combination of polyisobutylene and amorphous polypropylene, epichlorohydrin polymers, fluoroelastomer polymers, and blends of epichlorohydrin and fluoroelastomer polymers.

The compositions may also comprise other well-known additives for those materials, for example to improve their processability and/or suitability for particular applications. In the latter respect, for example, materials for use as power cable accessories may need to withstand outdoor environmental conditions. Suitable additives may thus include processing agents, stabilizers, antioxidants and plasticizers, for example oil, such as silicone oil. Compositions of the invention are made by mixing the inorganic particles on which conductive material is affixed with the polymer and any desired additives. In many embodiments of the compositions, conductive material, which is the same or different as the conductive material coated on the inorganic particles, will be dispersed in the polymeric material.

In at least one embodiment of the invention, the composition includes the discontinuous arrangement of conductive material on the inorganic particles in electrical contact with the inorganic particles and further includes conductive material dispersed in the polymeric material. The total amount of conductive material in the composition is between about 40 and about 70 vol % of the amount of conductive material needed to attain the composition's percolation threshold.

In at least one embodiment of the invention, the composition has a relative dielectric constant greater than about 15, preferably greater than about 18 and a dielectric loss of less than about 0.12, preferably less than about 0.05.

In at least one embodiment of the invention, the composition has a dielectric breakdown strength greater than about 4 kiloVolts/millimeter (kV/mm), preferably greater than about 7.2 kV/mm.

In at least one embodiment of the invention, the composition has a relative dielectric constant value that changes in a non-linear manner upon a change in applied voltage as illustrated in FIGS. 5 through 9.

In at least one embodiment of the invention, the polymeric material is an elastomeric material and the composition has an elongation at break of greater than about 150%, preferably greater than about 300% and a permanent set (as per ASTM D 412-06a) of less than about 25, preferably less than about 20, more preferably less than about 10.

In at least one embodiment of the invention, the composition has a modulus of elasticity of greater than about 150 pounds per square inch, preferably greater than about 230 pounds per square inch, and more preferably greater than about 300 pounds per square inch.

The compositions of the invention can be used in various articles for various applications, e.g., spray, coating, mastics, tapes, and shaped bodies having a definite configuration. The compositions of the present invention are particularly suitable for use in stress control elements or devices such as high voltage cable accessories, wherein the nonlinear properties of the compositions are useful. Dielectric stress control devices can be manufactured which are designed with respect to their dielectric properties and their geometric configurations in accordance with desirable modifications of an electric field present at the respective site of application. These stress control devices consist at least partly of the composition of the invention. Particularly useful is a dielectric stress control device or element which consists of a shaped body, preferably a sleeve, which can be placed onto an end of a cable insulation and/or shield. Stress control devices or elements having other geometric configurations may be useful to prevent unacceptably high local field concentrations, for example in break elbows, transition or throughgoing connections, feed throughs and branchings of high tension cables.

In at least one embodiment, the composition has elastomeric properties. This allows cold-shrink dielectric stress control devices to be manufactured which are suited for different dimensions or sizes of electrical structural components. For example in the case of sleeves, same may have sufficient resilience to be applicable with cable insulations and/or dimensions of various thicknesses.

The articles of the invention may be used in, for example, the following applications:

(i) Insulation for electric cables, where this insulation is situated between the conductor and the primary dielectric or between the screen of the cable and the primary dielectric.

(ii) Insulation for electric cables as in the layered construction described in U.S. Pat. No. 3,666,876.

(iii) Stress control coverings for electrical cable terminations. Such stress control means may be in the form of sprays, coatings, mastics, molded parts, tubing or tape and may be used with or without an external protective layer, as necessary.

(iv) Stress control coverings for stator-bar ends or the ends of insulated electrical conductors, e.g., motor windings, in machines.

(v) Stress control components in lightning arrestors.

(vi) As components of insulator bodies where the material may be the outer layer or an internal component, provided that it is non-tracking in service; thus it could be used for sheds or tubing to provide insulators for tension suspension, post or bushing insulators.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

EXAMPLES

The following examples and comparative examples are offered to aid in the understanding of the present invention and are not to be construed as limiting the scope thereof. Unless otherwise indicated, all parts and percentages are by weight. The following test methods and protocols were employed in the evaluation of the illustrative and comparative examples that follow:

Material List

TABLE 1

| Ingredient | Product | Name Source |
|---|---|---|
| Barium Titanate | 219-6A Barium Titanate (0.8-2.1 micron) | Ferro Corporation, Cleveland, OH |
| Carbon Powder | ENSACO250 G (40 nm) | TimCal Graphite & Carbon Corp., Bodio Switzerland |
| Collodial Silica | NALCO 2326 | Nalco, Bedford Park, IL |
| Isoctyltrimethoxy silane | | Gelest, Morrisville, PA |
| Methyltrimethoxy silane | | Gelest, Morrisville, PA |
| Ethanol 80:20 | | EMD, Gibbstown, NJ |
| Methanol | | VWR, West Chester, PA |
| Liquid Silicone Rubber | ELASTOSIL LR 3003/30 A/B | Wacker Chemie AG, Munich, Germany |
| Silicone Oil (Polydimethlysiloxane) | DOW CORNING 200 FLUID | Dow Corning Corporation, Midland, MI |
| Silica | | |
| Titanium dioxide | | |
| Calcium Titanate | | Alfa Aesar, Ward Hill, MA |
| Aluminum Powder | | Alfa Aesar, Ward Hill, MA |
| Toluene | | Alfa Aesar, Ward Hill, MA |

Test Methodologies
1. Relative dielectric constant and dissipation factor (loss) measurement: ASTM D150-98 (2004)
2. Breakdown strength: ASTM D149-09
3. Non linear relative dielectric constant: ASTM D150-98 (2004) modified by changing the voltage source to impulse waveform of 1.2 microseconds/50 microseconds.
4. Elongation to break: Standard Test Methods for Vulcanized Rubber and Thermoplastic Elastomers—Tension, ASTM D 412-06a Published January, 2007
5. Permanent Set: Permanent Tension Set of Rubber-22 hrs @ 100 Celsius—Electrical Products Standard, 3M Test Method TM-86D, Issue Date: Nov. 22, 1994
6. Volume Resistivity (Inverse of Electrical Conductivity): ASTM 257-07.

Example 1 to 5 and Comparative Examples C1 to C5

For examples 1-5, an inorganic filler material was first prepared by decorating conductive particles onto the surface of an inorganic particle, in this case a ferroelectric ceramic material. In these examples, barium titanate (BT) was used as the inorganic particle (particle size 0.8-2.1 micron), and a highly structured carbon powder (ENSACO 250 G) (C) was used as the conductive material. The carbon powder was decorated onto the barium titanate particle surface by mixing and pressing or grinding them together in a mortar and pestle for 5-10 minutes, until a homogeneous dispersion was obtained (as determined by the naked eye.). The resulting filler material was then blended in a liquid silicone rubber matrix. The volume percents of the BT and C in the final mixture and the BT:C ratios for each example are given in Table 2.

The resulting mixture was poured into a mold cavity (100 mil deep and 1.25 inch inner diameter) and partially cured at 160° C. for 8 minutes in a press. It was then removed from the mold and further cured in a convection oven at 200° C. for 4 hours. Electrical properties such as dielectric constant, dissipation factor and dielectric breakdown strength of these molded disks were then measured at ambient conditions. Example C1 describes a barium titanate (40 volume percent) control sample without the carbon powder. Examples C2 and C3 describe control samples with two filling levels of the carbon powder (3 and 5 volume percent) without barium titanate. The barium titanate and carbon powder were each separately blended in liquid silicone rubber using a "speed mixer" available under the trade designation DAC 150FVZ from FlackTek, Inc., Landrum, SC, at 3000 rpm for 30 seconds. The resulting mixture was molded in the same manner as Examples 1-5.

In Example C4, the barium titanate and carbon powder were mixed together but with no grinding. In Example C5, carbon was dispersed in a silicone rubber matrix followed by addition of the barium titanate particles. All of the comparative examples were molded into disks and cured as described for Examples 1-5.

The electrical properties of the resulting molded disks of Examples 1 to 5 and Comparative Examples C1 to C5 are listed in Table2.

TABLE 2

| Ex. | Barium Titanate (v %) | Carbon Black (v %) | BT/C ratio | Composite Dielectric Constant (K) at 100 Hz | Dissipation Factor (D) at 100 Hz | Dielectric Breakdown Strength | Mixing Process |
|---|---|---|---|---|---|---|---|
| 1 | 24.5 | 3 | 8.17 | 24.1 | 0.0346 | 5.79 kV/mm (147.1 V/mil) | BT/C Grinding |
| 2 | 27.5 | 3 | 9.12 | 21.1 | 0.0165 | 7.25 kV/mm (184.2 V/mil) | BT/C Grinding |
| 3 | 30.0 | 3 | 10 | 21.7 | 0.0139 | 7.10 kV/mm (180.4 V/mil) | BT/C Grinding |
| 4 | 20.0 | 3 | 6.67 | 14.5 | 0.0066 | 9.05 kV/mm (230 V/mil) | BT/C Grinding |
| 5 | 24.5 | 2 | 12.25 | 9.8 | 0.0016 | 11.69 kV/mm (296.9 V/mil) | BT/C Grinding |
| C1 | 40.0 | 0 | 40 | 13.5 | 0.0057 | 11.58 kV/mm (294.2 V/mil) | NA |
| C2 | 0.0 | 3 | | 5.4 | 0.0020 | 12.87 kV/mm (327 V/mil) | NA |
| C3 | 0.0 | 5 | | 188.9 | 0.6565 | 3.20 kV/mm (81.4 V/mil) | NA |
| C4 | 30.0 | 3 | 10 | 40.6 | 0.0381 | 3.84 kV/mm (97.6 V/mil) | BT/C No Grinding |
| C5 | 24.5 | 3 | 8.17 | 62.5 | 0.1415 | 2.60 kV/mm (66 V/mil) | C dispersion followed by BT addition |

Figure 5:
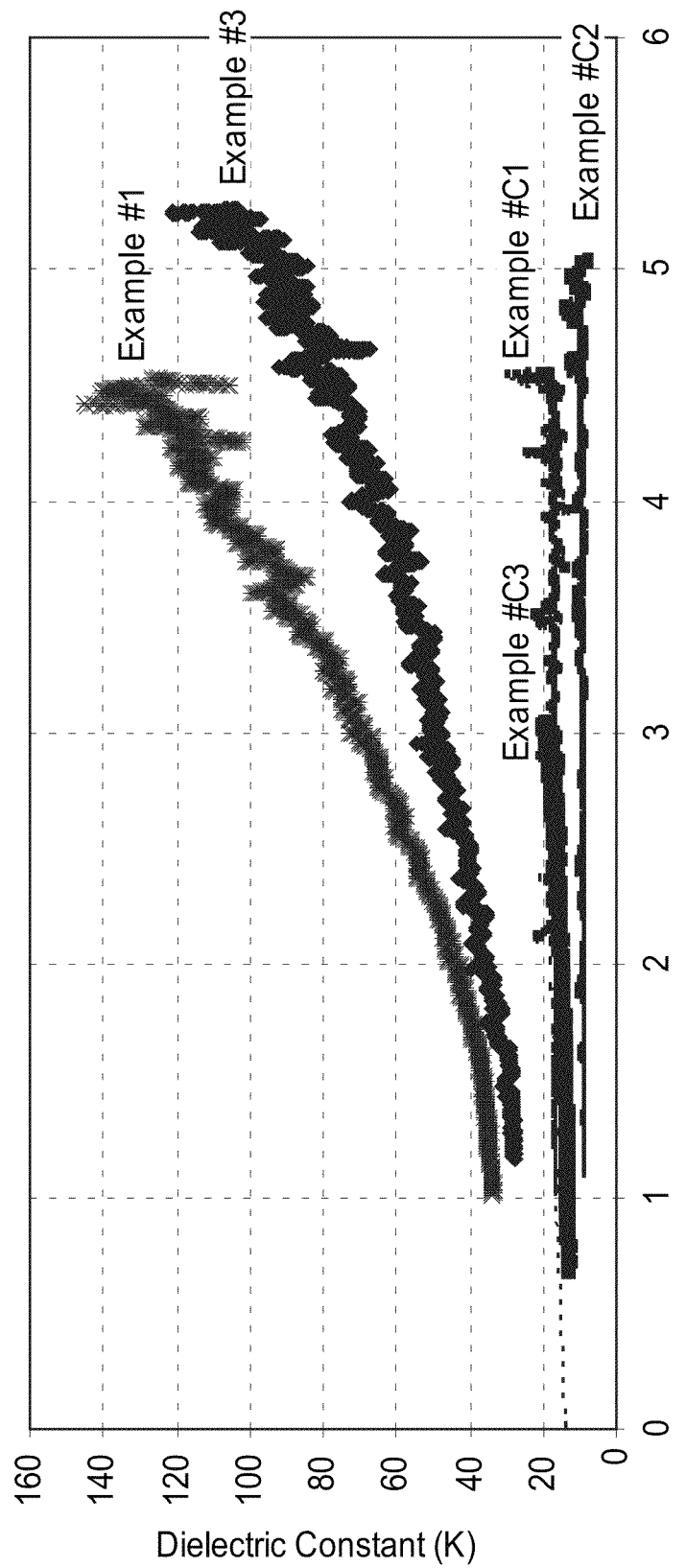
FIG. 5 illustrates the variation of dielectric constant with electric field for materials of the invention and comparative materials.

The variation of dielectric constant with electric field (non-linear properties) on selected examples in table 2 was measured by using the non-linear relative dielectric test. These test results are shown in FIG. 5. As seen in FIG. 5, Examples 1 and 3 show a non-linear increase in dielectric constant value with electric field increase. The dielectric constant value increases from 24.1 to 140 in Example 1 and that increases from 21.7 to 120 in Example 2 as the field strength increases up to 5.5 kV/mm. Under those experimental conditions, the Comparative Examples C1, C2 and C3 do not show non-linear dielectric properties.

Figure 6:
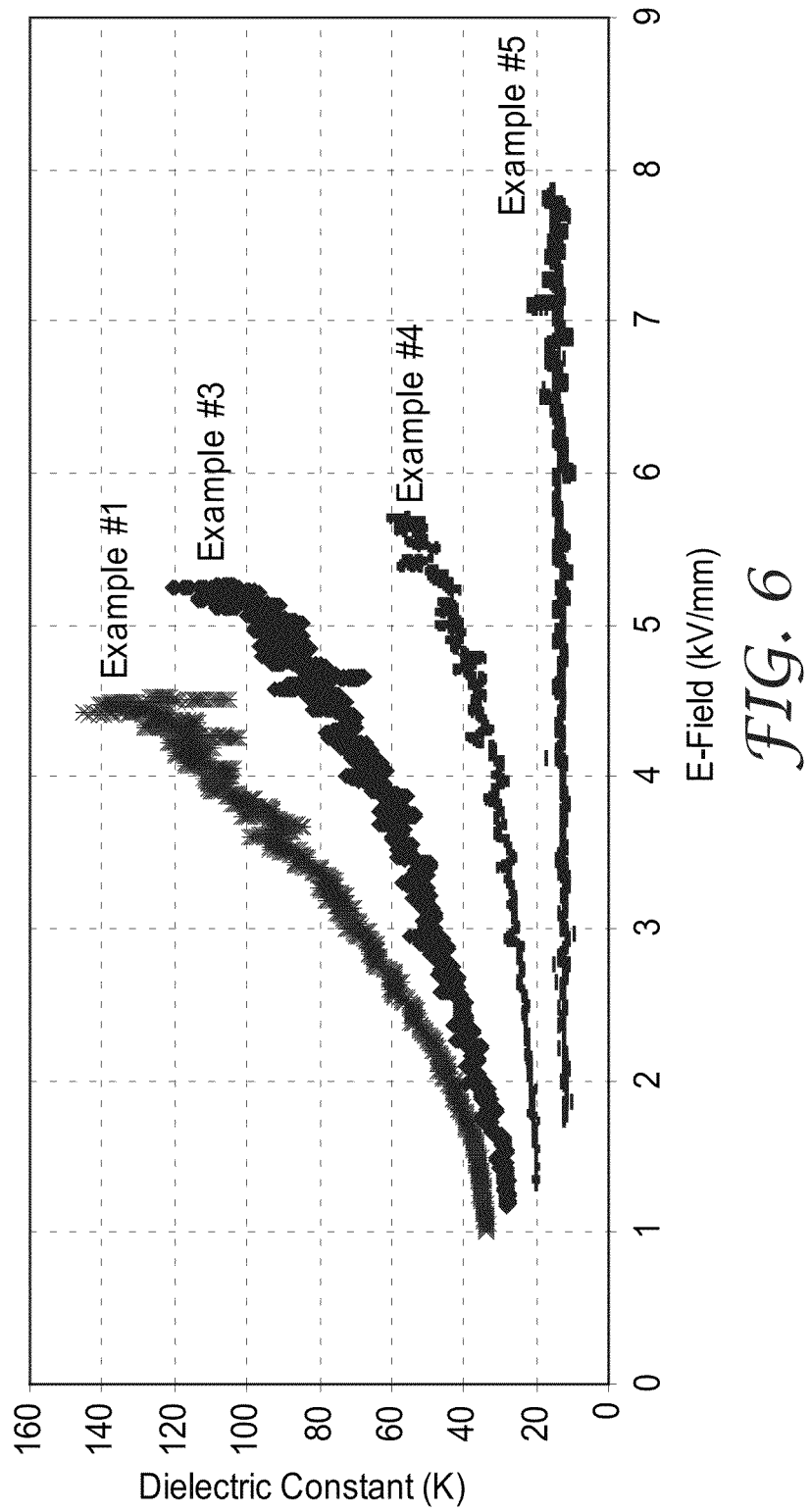
FIG. 6 illustrates the variation of dielectric constant with electric field for materials of the invention.
Figure 7:
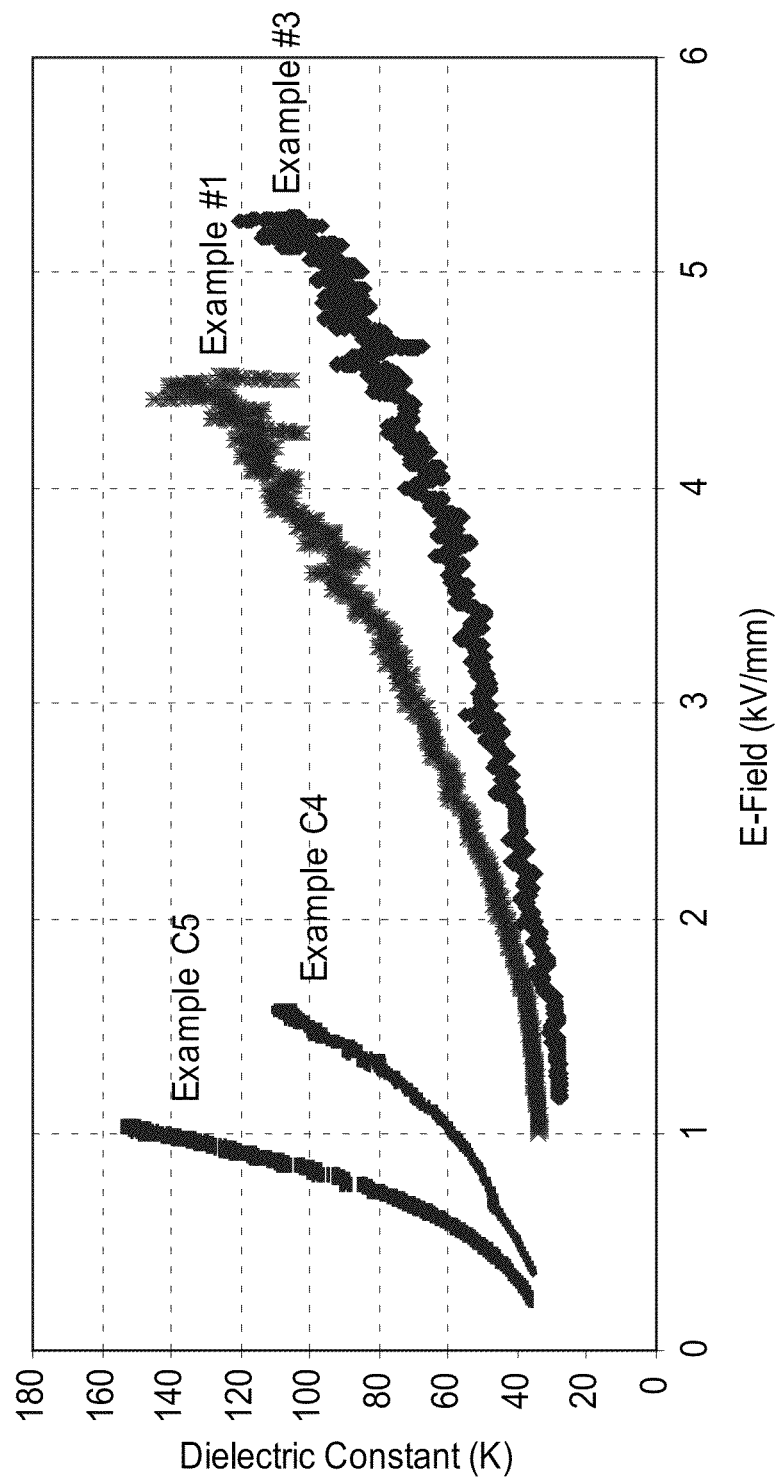
FIG. 7 illustrates the variation of dielectric constant with electric field for materials of the invention and comparative materials.

FIG. 6 shows the dielectric constant data of Examples 1, 3, 4, and 5. As seen in FIG. 6, Example 4 as well as Examples 1 and 3 show some non-linear dielectric properties whereas Example 5 shows no non-linear dielectric properties in the range of applied electric field.

As seen in Table 2, both Examples C4 and C5 have lower electric breakdown strength values than Examples 3 and 1, which have the same BT and C content, respectively. Example C4 has a breakdown strength of 3.84 kV/mm (97.6V/mil) and Example C5 has a dielectric breakdown strength of 2.60 kV/mm (66V/mil). In addition, the dielectric constants increase more rapidly with electric field in these examples than for Examples 1 and 3. In contrast, Examples 1 and 3 show gradual increase in dielectric constant and can withstand significantly higher field strength before reaching the dielectric breakdown of the material (Example 1 dielectric breakdown is 5.79 kV/mm and Example 3 dielectric breakdown is 7.10 kV/mm).

Examples 6-8—Fillers with Different K Values

Figure 8:
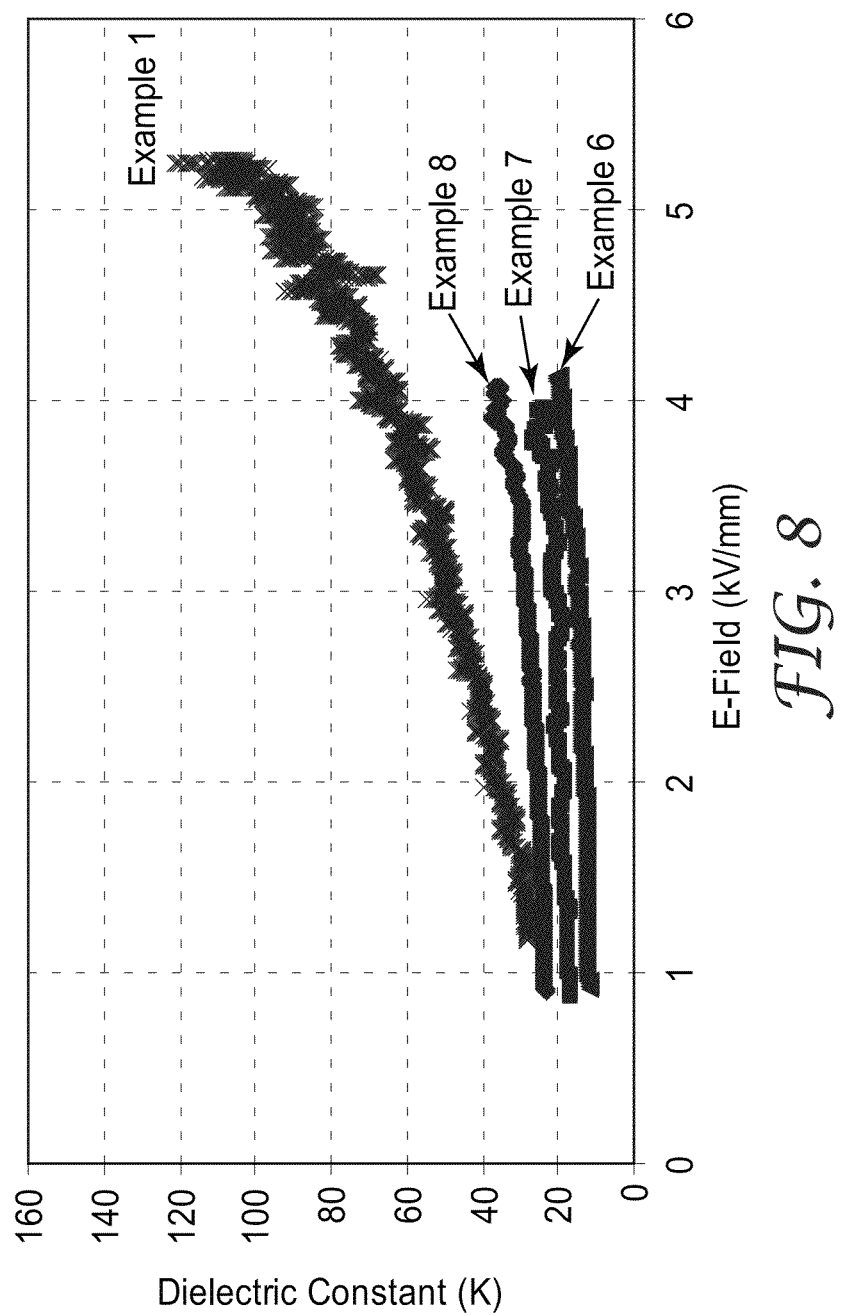
FIG. 8 illustrates the variation of dielectric constant with electric field for materials of the invention.

In these examples, barium titanate particles were substituted with silica, titanium dioxide calcium titanate, and strontium titanate particles. Silicone rubber disks were prepared as described for Examples 1-5 after grinding 30 volume percent of each type of inorganic particle with 3 volume percent of carbon powder. Electrical properties of each of these disks were then measured. The test results are summarized in Table 3, along with the test results for Example 3. In addition, non-linear dielectric properties were measured for Examples 6-8. The test results are shown in FIG. 8.

TABLE 3

| Ex. | Inorganic particle | Inorganic particle dielectric constant | Composite Dielectric Constant | Dissipation factor (D) | Dielectric Breakdown strength (V/mil) |
|---|---|---|---|---|---|
| 6 | Silica | 3 | 8.9 | 0.032 | 268 |
| 7 | Titanium dioxide | 70-80 | 11.9 | 0.005 | 205 |
| 8 | Calcium Titanate | 200-300 | 18.4 | 0.014 | 217 |
| 3 | Barium Titanate | 2000-4000 | 21.7 | 0.0139 | 180.4 |

Example 9

In this example, carbon powder was substituted with 18 volume percent aluminum powder (10 micron size) (calculated using a density of 1.5 g/cc). A silicone rubber disk was prepared as described in Examples 1-5 after grinding the Al powder with 24.5 volume percent barium titanate. The resultant disk had a dielectric constant (K) of 20.8 and a dissipation factor of 0.022.

Example 10

Preparation of Hydrophobically Modified Nanosilica Particle:

A mixture of 100 grams of colloidal silica (16.06 wt. % solids in water; 5 nm size), 7.54 grams of isoctyltrimethoxy silane, 0.81 grams of methyltrimethoxysilane and 112.5 grams of an 80:20 wt/wt. % solvent blend of ethanol: methanol were added to a 500 ml 3-neck round bottom flask (Ace Glass, Vineland, N.J.). The flask containing the mixture was placed in an oil bath set at 80° C. with stirring for 4 hours to prepare hydrophobically modified nanosilica particles. The hydrophobically modified nanosilica particles were transferred to a crystallizing dish and dried in a convection oven at 150° C. for 2 hours.

Nanosilica Particle Modification of Barium Titanate Filler:

Barium titanate particles (particle size 0.8-2.1 microns) were modified by mixing (using a spatula) with the hydrophobically modified nanosilica particles (0.75 wt %) and dispersing in excess toluene. The barium titanate and nanosilica particle mixture was rolled overnight and the toluene was then evaporated off at 150° C. The resulting powder was transferred to a large Nalgene bottle, four large ceramic marbles were added to the powder and shaken by hand for several minutes. This procedure resulted in a filler composition that had significantly reduced particle agglomeration. The scanning electron micrograph (SEM) of the nanosilica particle modified barium titanate is shown in FIG. 3.

Example 11

Preparation of Silicone Rubber Composites

Nanosilica particle modified barium titanate (NS BT) was decorated with carbon powder as described in Examples 1-5. About 25 volume percent NS BT and 3.0 volume percent carbon powder were ground together with a mortar and pestle for 5-10 minutes, until a homogeneous dispersion was obtained (as determined by the naked eye.). The ground powder mixture was blended in 62 volume percent liquid silicone rubber and 10 volume percent silicone oil using a "speed mixer" available under the trade designation DAC 150FVZ from FlackTek, Inc., Landrum, SC, at 3000 rpm for 30 seconds. The resulting silicone rubber composite was then poured into a mold (3×6×0.07 in) and partially cured at 160° C. for 10 minutes in a press. The partially cured slab was then removed from the mold and further cured at 200° C. for 4 hours. A cross-section SEM of the cured slab shows homogenous distribution of NS BT particles throughout the silicone matrix (FIG. 4).

Three samples were used for each test conducted to determine electrical and mechanical properties. The ranges of the test results for the three samples are given below.

Figure 9:
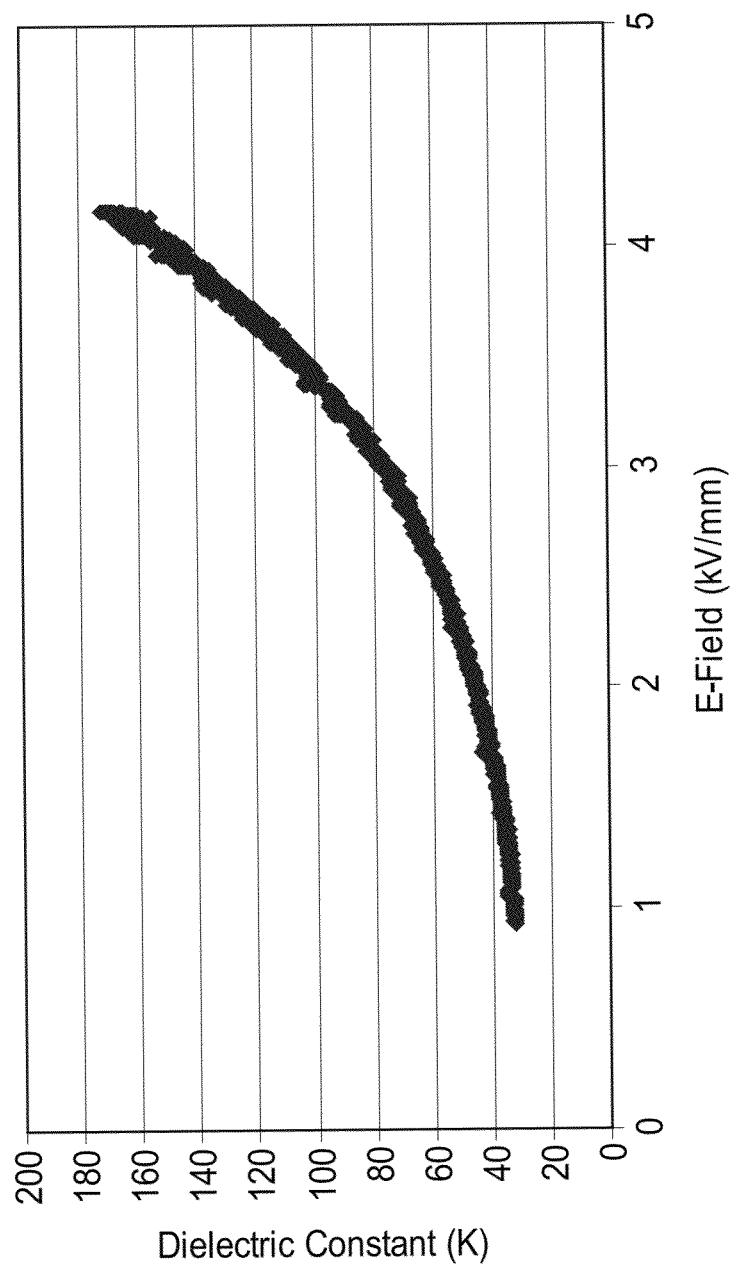
FIG. 9 illustrates the variation of dielectric constant with electric field at 25 kV for a material of the invention.

Electrical Properties:

Dielectric constant and dissipation factor measurements were made by following the ASTM D150-98 (2004) test procedure at 100 Hz. Volume resistivity measurements were made by following the ASTM 257-07 test procedures at 100 Hz. Dielectric breakdown strength measurements were made by following the ASTM D149-09 test procedure. The range of test results is as follows:

Dielectric constant 23-30
Dissipation factor<0.05
Volume Resistivity: 1.4 E8-E9 Ohm/m
Dielectric breakdown voltage strength 180-210 V/mil range The electrical field dependent relative dielectric constant under impulse condition was measured at 25 kV by using the non-linear relative dielectric constant test. The test results are shown in FIG. 9.

Mechanical Properties:

The tensile strength, percent elongation to break, modulus and permanent tension set are measured by using ASTM D412-06a test procedure. The range of test results is as follows:

Tensile strength: 372-498 psi
Elongation to break: 320-410%
Modulus: 232-255 psi @ 100% elongation
285-429 psi @ 200% elongation
300-479 psi @ 300% elongation
Permanent tension set 9.4-10.10%

In comparison, to the 320-410% elongation to break of Example 11, the elongation to break of Example 3, made without the NS BT and silicon oil, was 166%.

What is claimed is:

1. A composition comprising:
    an elastomeric material;
    a filler material dispersed in the elastomeric material, the filler material comprising inorganic particles and a discontinuous arrangement of conductive material, wherein at least a portion of the conductive material is in durable electrical contact with the inorganic particles; and
    conductive material dispersed in the elastomeric material;
    wherein the volume ratio of the inorganic particles to conductive material is about 6 to about 12; and wherein the inorganic particles are modified with nanosilica particles.

2. The composition of claim 1 wherein the conductive material is selected from the group consisting of carbon black, carbon nanotubes, clusters of carbon particles, graphite, insulating particles having conductive coatings, metals such as silver, gold, palladium, and aluminum, and alloys of such metals, and combinations thereof.

3. The composition of claim 1 wherein the conductive material in durable electrical contact with the inorganic particles and the conductive material dispersed in the elastomeric material are different materials.

4. The composition of claim 1 wherein the combined amount of conductive material in the composition is between about 40 and about 70 vol% of the amount of conductive material needed to attain the composition's percolation threshold.

5. The composition of claim 1 further comprising a relative dielectric constant value that changes in a non-linear manner upon a change in applied voltage.

6. The composition of claim 1 wherein the volume loading of the inorganic particles in the composition is about 20 to about 40 volume percent.

7. The composition of claim 1 wherein the elastomeric material comprises silicone.

8. The composition of claim 1 wherein the filler material comprises nanosilica-modified barium titanate.

9. The composition of claim 8 wherein the conductive material comprises carbon.

10. The composition of claim 1 further comprising silicone oil.

* * * * *